(12) United States Patent
Yoo et al.

(10) Patent No.: US 11,901,589 B2
(45) Date of Patent: Feb. 13, 2024

(54) CYLINDRICAL SECONDARY BATTERY MODULE

(71) Applicant: LG CHEM, LTD., Seoul (KR)

(72) Inventors: Jae-Min Yoo, Daejeon (KR); Dal-Mo Kang, Daejeon (KR); Su-Chang Kim, Daejeon (KR); Jeong-O Mun, Daejeon (KR); Jae-Uk Ryu, Daejeon (KR); Ji-Su Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 42 days.

(21) Appl. No.: 16/619,849

(22) PCT Filed: Nov. 12, 2018

(86) PCT No.: PCT/KR2018/013739
§ 371 (c)(1),
(2) Date: Dec. 5, 2019

(87) PCT Pub. No.: WO2019/112197
PCT Pub. Date: Jun. 13, 2019

(65) Prior Publication Data
US 2020/0161598 A1    May 21, 2020

(30) Foreign Application Priority Data
Dec. 7, 2017  (KR) .......................... 10-2017-0167140

(51) Int. Cl.
*H01M 50/583* (2021.01)
*H01M 50/505* (2021.01)
(Continued)

(52) U.S. Cl.
CPC ....... *H01M 50/583* (2021.01); *H01M 50/213* (2021.01); *H01M 50/503* (2021.01);
(Continued)

(58) Field of Classification Search
CPC ............ H01M 50/526; H01M 50/583; H01M 50/516; H01M 2200/103; H01M 50/507;
(Continued)

(56) References Cited

U.S. PATENT DOCUMENTS

2006/0019166 A1   1/2006  Seman, Jr. et al.
2006/0032667 A1   2/2006  Sato
(Continued)

FOREIGN PATENT DOCUMENTS

CN    102110798 A    6/2011
CN    106848143 A    6/2017
(Continued)

OTHER PUBLICATIONS

Extended European Search Report for European Application No. 18885451.7, dated Sep. 24, 2020.
(Continued)

*Primary Examiner* — Matthew T Martin
*Assistant Examiner* — Jessie Walls-Murray
(74) *Attorney, Agent, or Firm* — Birch, Stewart, Kolasch & Birch, LLP

(57) ABSTRACT

A cylindrical secondary battery module including a plurality of cylindrical secondary battery cells respectively having a battery case in which an electrode assembly and an electrolyte are accommodated; a cell frame at which the plurality of cylindrical secondary battery cells are disposed; and a bus bar electrically connected to the plurality of cylindrical secondary battery cells and having a fusing portion, wherein the bus bar has a plurality of layers made of different materials from each other.

8 Claims, 6 Drawing Sheets

(51) Int. Cl.
*H01M 50/528* (2021.01)
*H01M 50/524* (2021.01)
*H01M 50/516* (2021.01)
*H01M 50/526* (2021.01)
*H01M 50/503* (2021.01)
*H01M 50/213* (2021.01)
*H01M 50/107* (2021.01)
*H01M 50/581* (2021.01)
*H01M 50/522* (2021.01)
*H01M 50/284* (2021.01)

(52) U.S. Cl.
CPC ....... *H01M 50/505* (2021.01); *H01M 50/516* (2021.01); *H01M 50/522* (2021.01); *H01M 50/524* (2021.01); *H01M 50/526* (2021.01); *H01M 50/528* (2021.01); *H01M 50/581* (2021.01); *H01M 50/107* (2021.01); *H01M 50/284* (2021.01); *H01M 2200/103* (2013.01); *H01M 2220/20* (2013.01)

(58) Field of Classification Search
CPC ............. H01M 50/528; H01M 50/505; H01M 50/502; H01M 50/503; H01M 50/581; H01M 50/213
See application file for complete search history.

(56) References Cited

U.S. PATENT DOCUMENTS

| | | | |
|---|---|---|---|
| 2007/0099073 A1* | 5/2007 | White | H01M 50/213 429/61 |
| 2011/0159353 A1 | 6/2011 | Byun et al. | |
| 2011/0171505 A1* | 7/2011 | Kishll | H01M 50/20 429/82 |
| 2011/0177365 A1 | 7/2011 | Yasui et al. | |
| 2011/0305936 A1* | 12/2011 | Kwag | H01M 50/571 429/121 |
| 2013/0136974 A1 | 5/2013 | Lim et al. | |
| 2013/0202941 A1 | 8/2013 | Ono et al. | |
| 2013/0323549 A1 | 12/2013 | Choi et al. | |
| 2014/0255750 A1 | 9/2014 | Jan et al. | |
| 2016/0181579 A1 | 6/2016 | Geshi et al. | |
| 2016/0265760 A1 | 9/2016 | Yoshida et al. | |
| 2016/0315303 A1* | 10/2016 | Eberhard | H01M 50/502 |
| 2016/0315304 A1 | 10/2016 | Biskup | |
| 2017/0077487 A1* | 3/2017 | Coakley | H05K 1/189 |
| 2017/0250395 A1 | 8/2017 | Cheon et al. | |
| 2018/0366711 A1* | 12/2018 | Igarashi | H01M 50/522 |
| 2020/0168878 A1* | 5/2020 | Lee | H01M 50/20 |
| 2021/0036300 A1* | 2/2021 | Bae | H01M 50/583 |

FOREIGN PATENT DOCUMENTS

| | | |
|---|---|---|
| EP | 3 419 083 A1 | 12/2018 |
| JP | 2004-265610 A | 9/2004 |
| JP | 2007-508681 A | 4/2007 |
| JP | 2014-170645 A | 9/2014 |
| JP | 2016-66455 A | 4/2016 |
| JP | 2017-84603 A | 5/2017 |
| KR | 10-2011-0094415 A | 8/2011 |
| KR | 10-2012-0052189 A | 5/2012 |
| KR | 10-2013-0059301 A | 6/2013 |
| KR | 10-2013-0060420 A | 6/2013 |
| KR | 10-2014-0064093 A | 5/2014 |
| KR | 10-2015-0111160 A | 10/2015 |
| KR | 10-2016-0008823 A | 1/2016 |
| KR | 10-2017-0101604 A | 9/2017 |
| KR | 10-2017-0106933 A | 9/2017 |
| WO | WO 2011/007547 A1 | 1/2011 |
| WO | WO 2012/164884 A1 | 12/2012 |
| WO | WO 2015/084097 A1 | 5/2015 |

OTHER PUBLICATIONS

International Search Report issued in PCT/KR2018/013739 (PCT/ISA/210), dated Feb. 19, 2019.

* cited by examiner

CYLINDRICAL SECONDARY BATTERY MODULE

TECHNICAL FIELD

The present application claims priority to Korean Patent Application No. 10-2017-0167140 filed on Dec. 7, 2017 in the Republic of Korea, the disclosures of which are incorporated herein by reference.

The present disclosure relates to a cylindrical secondary battery module, and more particularly, to a cylindrical secondary battery module including a bus bar that has a fusing function and a protecting function against a physical impact.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes a secondary battery cell in which a positive electrode plate and a negative electrode plate, respectively coated with the positive electrode active material and the negative electrode active material, are arranged with a separator therebetween, and an outer member, that is a battery case, which seals and receives the secondary battery cell together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In general, the secondary battery may be classified into a cylindrical type, a rectangular type and a pouch type depending on the shape of the exterior in which the secondary battery cells are accommodated.

FIG. 1(a) is a schematic cross-sectioned view showing that a bus bar is coupled to a cylindrical secondary battery cell in a conventional cylindrical secondary battery module, and FIG. 1(b) is a schematic cross-sectioned view showing that a wire is coupled to the cylindrical secondary battery cell at the conventional cylindrical secondary battery module.

Referring to FIG. 1(a), a bus bar 1 is directly connected to a secondary battery cell 2. However, since the thickness of the bus bar 1 is greater than a normal fuse, the bus bar 1 is not able to function as a fuse, and thus the current connection cannot be disconnected when overcurrent or high temperature occurs. In addition, referring to FIG. 1(b), a bus bar 3 is connected to a secondary battery cell 5 through a wire 4. However, since there is no means for protecting the wire 4, the wire 4 is vulnerable to a physical impact.

DISCLOSURE

Technical Problem

The present disclosure is directed to providing a cylindrical secondary battery module, in which a bus bar may have both a fusing function and an electrically connecting function for secondary battery cells and be protected against a physical impact.

In addition, the present disclosure is directed to providing a cylindrical secondary battery module, which may protect the secondary battery cells from overcurrent or high temperature by using the fusing function of the bus bar.

Technical Solution

In one aspect of the present disclosure, there is provided a cylindrical secondary battery module, comprising: a plurality of cylindrical secondary battery cells respectively having a battery case in which an electrode assembly and an electrolyte are accommodated; a cell frame at which the plurality of cylindrical secondary battery cells are disposed; and a bus bar electrically connected to the cylindrical secondary battery cells and having a fusing portion, wherein the bus bar has a plurality of layers made of different materials from each other.

Also, the bus bar may have a plate shape to cover at least one of an upper portion and a lower portion of the plurality of cylindrical secondary battery cells, and the fusing portion may be formed at the bus bar in a number corresponding to the number of the plurality of cylindrical secondary battery cells.

In addition, the bus bar may include at least one synthetic resin film having a hollow formed therein; and a conductive plate protected by the synthetic resin film.

Also, the bus bar may be configured so that two synthetic resin films are coupled to an upper surface and a lower surface of one conductive plate, respectively.

In addition, the conductive plate may include: a welding portion provided to be coupled to the cylindrical secondary battery cell by welding; a hole formed along a periphery of the welding portion; a large-area plate portion spaced apart from the welding portion by the hole to be distinguished from the welding portion; and a fusing portion formed to connect the welding portion and the large-area plate portion so as to be cut off when an overcurrent flows at the conductive plate.

Also, the synthetic resin film may be coupled to an upper side and a lower side of the conductive plate to surround the conductive plate, and the welding portion may be exposed to the outside through the hollow.

In addition, a width of the fusing portion may be smaller than a width of the hole.

Also, the welding portion may be divided into a first resistance welding portion and a second resistance welding portion by a cut portion formed at the center of the welding portion.

Meanwhile, in another aspect of the present disclosure, there is also provided a secondary battery pack including the cylindrical secondary battery module described above, and there is also provided a vehicle including the cylindrical secondary battery module.

Advantageous Effects

According to the embodiments of the present disclosure, the bus bar may have both a fusing function and an electrically connecting function for secondary battery cells and also be protected against a physical impact.

In addition, the secondary battery cells may be protected from overcurrent or high temperature by using the fusing function of the bus bar.

BEST MODE

Figure 1A:
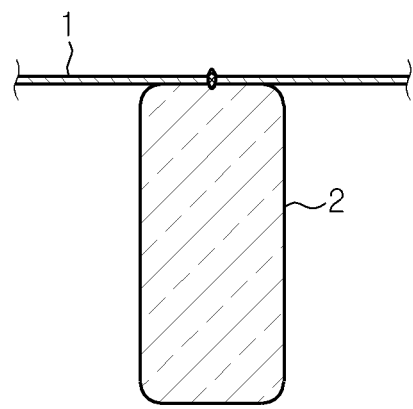
FIG. 1(a) is a schematic cross-sectioned view showing that a bus bar is coupled to a cylindrical secondary battery cell in a conventional cylindrical secondary battery module.
Figure 1B:
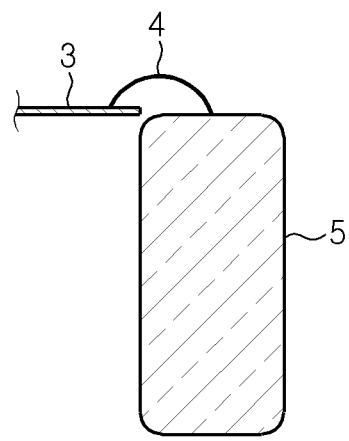
FIG. 1(b) is a schematic cross-sectioned view showing that a wire is coupled to the cylindrical secondary battery cell at the conventional cylindrical secondary battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
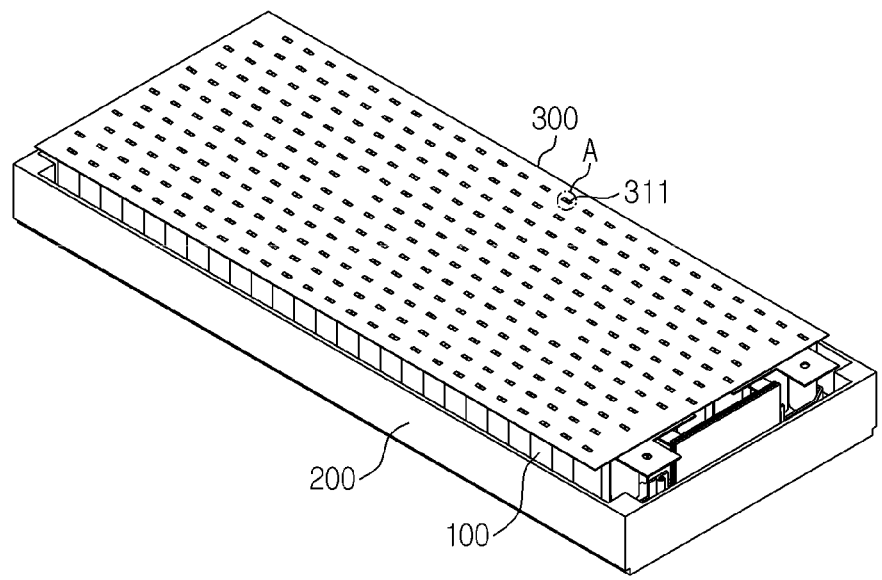
FIG. 2 is a schematic perspective view showing a cylindrical secondary battery module according to the first embodiment of the present disclosure.
Figure 3:
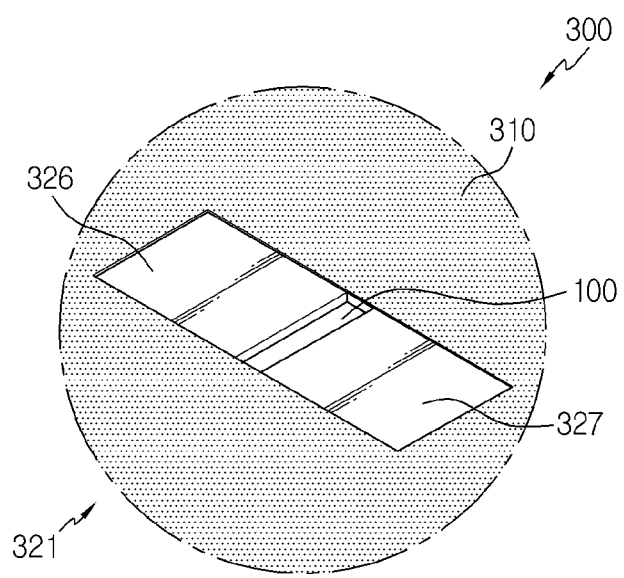
FIG. 3 is an enlarged view showing a portion A of FIG. 2.
Figure 4:
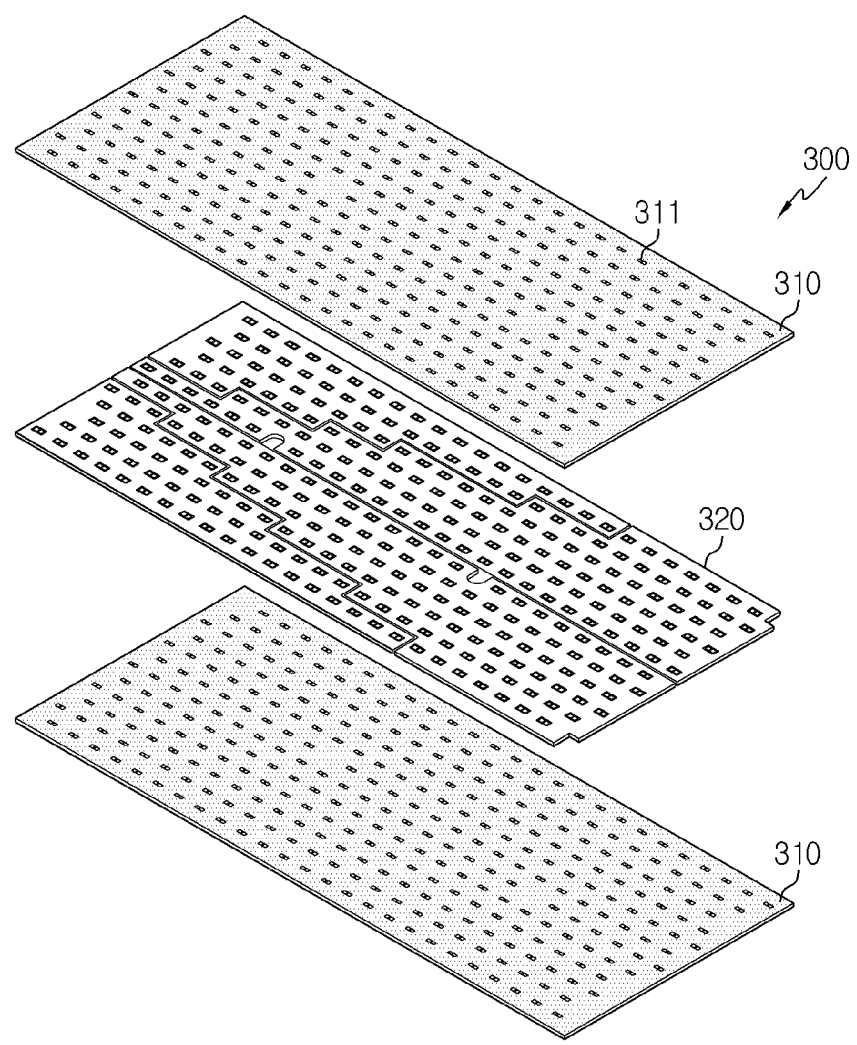
FIG. 4 is an exploded perspective view showing a bus bar having a plurality of layers, employed at the cylindrical secondary battery module according to the first embodiment of the present disclosure.
Figure 5:
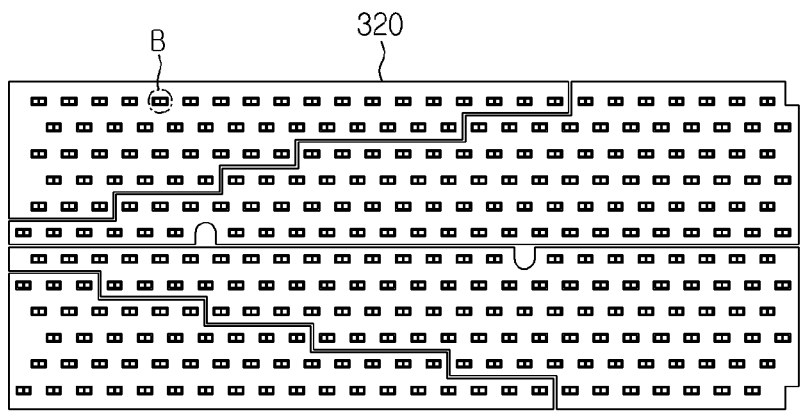
FIG. 5 is a plane view showing a conductive plate, employed at the cylindrical secondary battery module according to the first embodiment of the present disclosure.
Figure 6:
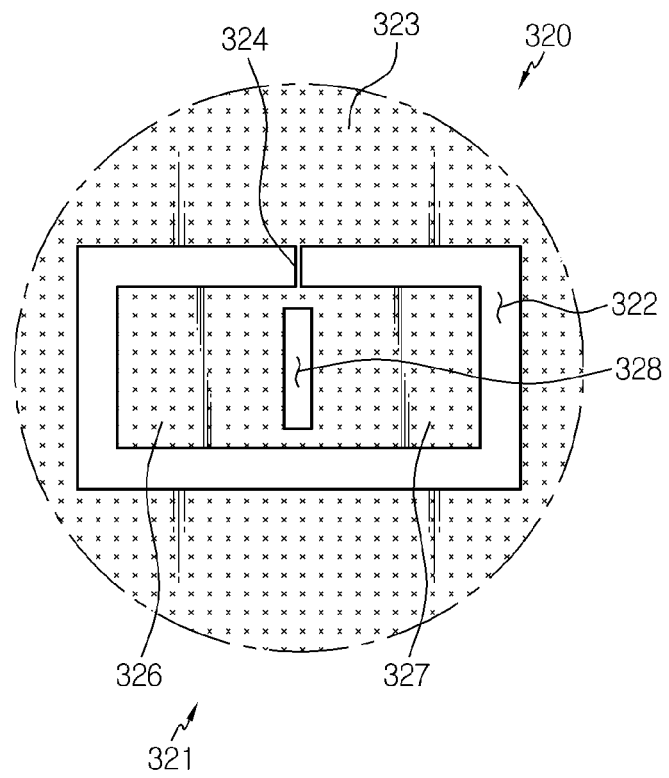
FIG. 6 is an enlarged view showing a portion B of FIG. 5.
Figure 7:
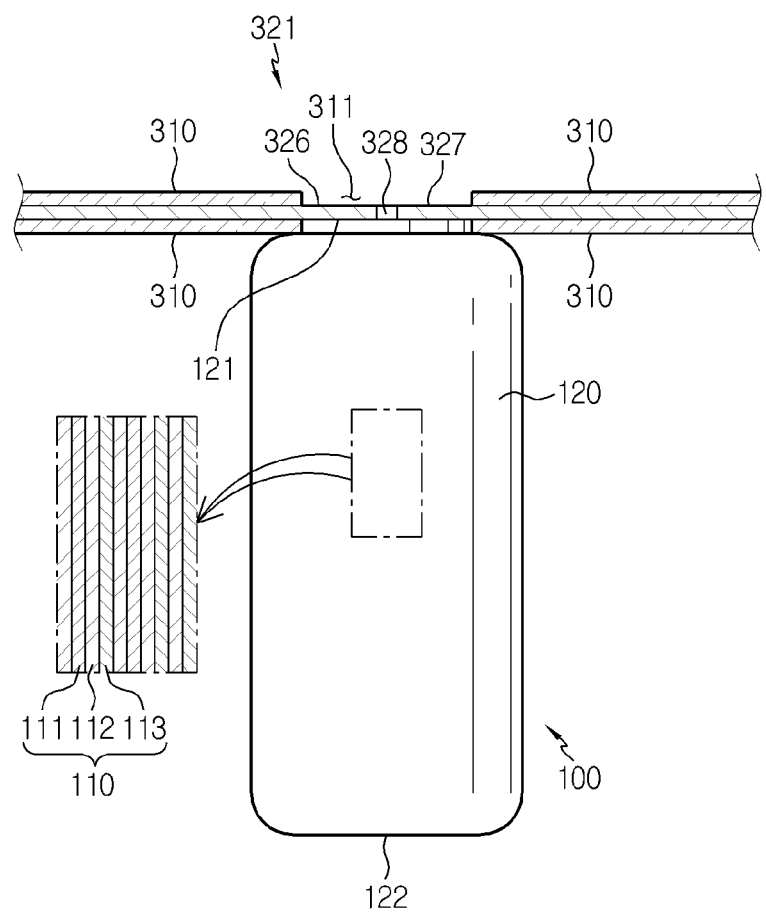
FIG. 7 is a cross-sectioned view showing that the bus bar is coupled to the secondary battery cell at the cylindrical secondary battery module according to the first embodiment of the present disclosure.

FIG. 2 is a schematic perspective view showing a cylindrical secondary battery module according to the first embodiment of the present disclosure, FIG. 3 is an enlarged view showing a portion A of FIG. 2, FIG. 4 is an exploded perspective view showing a bus bar having a plurality of layers, employed at the cylindrical secondary battery module according to the first embodiment of the present disclosure, FIG. 5 is a plane view showing a conductive plate, employed at the cylindrical secondary battery module according to the first embodiment of the present disclosure, FIG. 6 is an enlarged view showing a portion B of FIG. 5, and FIG. 7 is a cross-sectioned view showing that the bus bar is coupled to the secondary battery cell at the cylindrical secondary battery module according to the first embodiment of the present disclosure.

Referring to FIGS. 2 to 7, a cylindrical secondary battery module 10 according to an embodiment of the present disclosure includes a plurality of cylindrical secondary battery cells 100, a cell frame 200, and a bus bar 300, and the bus bar 300 has a plurality of layers made of different materials from each other.

Referring to FIG. 7, the cylindrical secondary battery cell 100 includes an electrode assembly 110, for example a jelly-roll type electrode assembly 110, a cylindrical battery case 120 in which an electrolyte is accommodated together with the electrode assembly 110, and a positive electrode terminal 121 formed at, for example, an upper portion of the battery case 120, and a negative electrode terminal 122 formed at, for example, a lower portion of the battery case 120. In FIG. 7, a conductive plate 320 of the bus bar 300 is coupled to the positive electrode terminal 121, but it is also possible that the conductive plate 320 of the bus bar 300 is coupled to the negative electrode terminal 122. The electrode assembly 110 may have a structure in which a positive electrode 111, a negative electrode 113, and a separator 112 interposed between the positive electrode 111 and the negative electrode 113 are wound in a jelly-roll shape. A lead (not shown) of the positive electrode 111 may be attached to the positive electrode 111 and connected to a positive electrode terminal 121 at, for example, an upper side of the battery case 120. A negative electrode lead (not shown) may be attached to the negative electrode 113 and connected to a negative electrode terminal 122 at, for example, a lower side of the battery case 120. In addition, a cylindrical center pin (not shown) may be inserted at a center of the electrode assembly 110. The center pin (not shown) fixes and supports the electrode assembly 110 and may function as a passage for discharging gas generated by internal reactions in charging, discharging and operating.

Meanwhile, the plurality of cylindrical secondary battery cells 100 may be connected in series or in parallel by various methods. For example, the bus bars 300 may be respectively connected to the positive electrode terminals 121 and the negative electrode terminals 122 of the cylindrical secondary battery cells 100 and connected in series or in parallel.

Referring to FIG. 2, the plurality of cylindrical secondary battery cells 100 may be disposed at the cell frame 200, and the cell frame 200 may be formed in various shapes corresponding to the shapes of the plurality of cylindrical secondary battery cells 100. In addition, the cell frame 200 may be made of various materials. The cell frame 200 may use a metal material to maintain a predetermined rigidity, without being limited thereto.

The bus bar 300 is electrically connected to the cylindrical secondary battery cells 100 and has a fusing portion 324 (see FIG. 6). The bus bar 300 may be a flexible substrate such as a flexible printed circuit board (FPCB). The bus bar 300 may be formed in a plate shape so as to cover an upper portion or a lower portion of the plurality of cylindrical secondary battery cells 100. However, even though it is illustrated in FIGS. 2 and 7 that the bus bar 300 is coupled only to the upper portion of the plurality of cylindrical secondary battery cells 100, the present disclosure is not limited thereto.

Referring to FIG. 4, the bus bar 300 may include a plurality of layers made of different materials from each other. For example, the bus bar 300 may include a synthetic resin film 310 and a conductive plate 320. Hereinafter, the synthetic resin film 310 and the conductive plate 320 will be described.

Referring to FIGS. 4 and 7, the synthetic resin film 310 may have a hollow 311 formed therein and is coupled to the conductive plate 320 to protect the conductive plate 320. At least one synthetic resin film 310 may be provided, and in this embodiment, as in FIG. 4, two synthetic resin films 310 are coupled to the upper and lower surfaces of one conductive plate 320, respectively, to protect the conductive plate 320. However, the number of synthetic resin films 310 is not limited to two but may be more various. The synthetic resin film 310 may be coupled to the upper and lower sides of the conductive plate 320 to surround the conductive plate 320. Here, a part of the conductive plate 320 may be exposed to the outside through the hollow 311 formed at the synthetic resin film 310, and the part of the conductive plate 320 exposed to the outside through the hollow 311 of the synthetic resin film 310 may serve as a welding portion 321, explained later.

The conductive plate 320 is electrically connected to the cylindrical secondary battery cells 100, and, referring to FIG. 4, the conductive plate 320 may be interposed between two synthetic resin films 310 and protected by the synthetic resin films 310. The conductive plate 320 may be made of copper, without being limited thereto. Referring to FIGS. 5 and 6, the fusing portion 324 may be formed at the conductive plate 320. That is, the conductive plate 320 gives a fusing function as well as electrically connects the cylindrical secondary battery cells 100. In addition, the conductive plate 320 may be protected from physical impact by the two synthetic resin films 310 coupled to the upper and lower sides thereof.

The conductive plate 320 may include a welding portion 321, a hole 322, a large-area plate portion 323, and a fusing portion 324. Referring to FIGS. 3 and 7, the welding portion 321 is formed so that the conductive plate 320 is coupled to the cylindrical secondary battery cell 100 by welding. The welding portion 321 of the conductive plate 320 is exposed to the outside through the hollow 311 formed at the synthetic resin film 310, and the conductive plate 320 is electrically coupled to the cylindrical secondary battery cell 100 by welding. As shown in FIGS. 6 and 7, the welding portion 321 may be divided into two parts. That is, the welding portion 321 may be separated into a first resistance welding portion 326 and a second resistance welding portion 327 by a cut portion 328 formed at the center of the welding portion 321. In this case, different polarities may be formed at two regions of the welding portion 321 so that a current may flow during resistance welding. That is, for example, a positive polarity may be connected to the first resistance welding portion 326, and a negative polarity may be connected to the second resistance welding portion 327. Here, referring to FIG. 6, the cut portion 328 may be formed not to be connected to the hole 322. However, if the welding is performed other than resistance welding, the welding portion 321 may not necessarily be divided into two parts, as explained later in relation to the second embodiment. The hole 322 is formed by perforating the conductive plate 320 and is formed along the periphery of the welding portion 321 of the conductive plate 320 so that the fusing portion 324, explained later, is formed at the conductive plate 320. That is, the hole 322 may be formed around the fusing portion 324 to reduce the width of the fusing portion 324. Here, the fusing portion 324 may also be formed to have a small thickness. The large-area plate portion 323 is a portion is separated from the welding portion 321 by the hole 322 in the conductive plate 320 and is distinguished from the welding portion 321. That is, the large-area plate portion 323 and the welding portion 321 are separated from each other by the hole 322, but the welding portion 321 and the large-area plate portion 323 are connected to each other by the fusing portion 324, explained later. If the conductive plate 320 is made of copper, the welding portion 321, the large-area plate portion 323 and the fusing portion 324 may all be made of copper.

The fusing portion 324 is formed at the conductive plate 320 of the bus bar 300. The fusing portion 324 connects the welding portion 321 and the large-area plate portion 323 as described above but is formed to be disconnected when an overcurrent flows through the conductive plate 320. Here, the fusing portion 324 is formed to have a sufficiently small width so that the fusing portion 324 may be cut broken when an overcurrent flows through the conductive plate 320. However, the width of the fusing portion 324 may be determined differently depending on the material and size of the bus bar 300, current intensity, voltage intensity or the like. For example, the width of the fusing portion 324 may be smaller than the width of the hole 322. Meanwhile, if the bus bar 300 covers the upper portion of the plurality of cylindrical secondary battery cells 100 as described above, the bus bar 300 may have a number of fusing portions 324 corresponding to the number of the cylindrical secondary battery cells 100.

Hereinafter, the operation and effect of the cylindrical secondary battery module according to the first embodiment of the present disclosure will be described with reference to the drawings.

Referring to FIG. 4, the bus bar 300 may include a plurality of layers made of different materials from each other. For example, a conductive plate 320 may be interposed between two synthetic resin films 310 having hollows 311 formed therein. Here, referring to FIG. 7, the conductive plate 320 is exposed to the outside only through the hollow 311 of the synthetic resin film 310, and a portion of the synthetic resin film 310 where the hollow 311 is not formed is coupled to the conductive plate 320 to protect the conductive plate 320. In addition, in the portion of the conductive plate 320 exposed through the hollows 311 of the synthetic resin film 310, a region exposed through the hollow 311 at a lower side is in contact with the cylindrical secondary battery cell 100, and a region exposed through the hollow 311 at an upper side is welded. That is, referring to FIG. 6, the upper portion of the conductive plate 320 exposed through the hollow 311 of the synthetic resin film 310 forms a welding portion 321. In addition, the conductive plate 320 includes a welding portion 321 and a large-area plate portion 323, and the welding portion 321 and the large-area plate portion 323 are connected to each other by a fusing portion 324 with a small width. Here, an opening may be formed along the periphery of the welding portion 321 so that the welding portion 321 and the large-area plate portion 323 may be connected by the thin fusing portion 324 with a small width. In addition, the welding portion 321 may be divided into a first resistance welding portion 326 and a second resistance welding portion 327 by a cut portion 328 formed at the center of the welding portion 321. Referring to FIG. 3, among the welding portion 321, the hole 322, the large-area plate portion 323, the fusing portion 324 and the cut portion 328 of the conductive plate 320, the hole 322, the large-area plate portion 323 and the fusing portion 324 are coupled to the synthetic resin film 310 and protected without being exposed to the outside, and the welding portion 321 and the cut portion 328 are exposed to the outside through the hollow 311 formed at the synthetic resin film 310. In addition, a worker may perform welding such as resistance welding to the welding portion 321 exposed to the outside through the hollow 311 formed at the synthetic resin film 310 to electrically connect the bus bar 300 to the cylindrical secondary battery cell 100. By doing so, the bus bar 300 may electrically connect the cylindrical secondary battery cells 100. In addition, since the fusing portion 324 formed at the conductive plate 320 of the bus bar 300 is cut when an overcurrent or a high temperature is generated, it is possible to protect the cylindrical secondary battery cells 100. Moreover, since the fusing portion 324 is disposed inside the synthetic resin film 310, the fusing portion 324 may be protected from external physical impacts. That is, the fusing portion 324 is provided to be cut off by an overcurrent or high temperature but is not cut off by an external physical impact.

Figure 8:
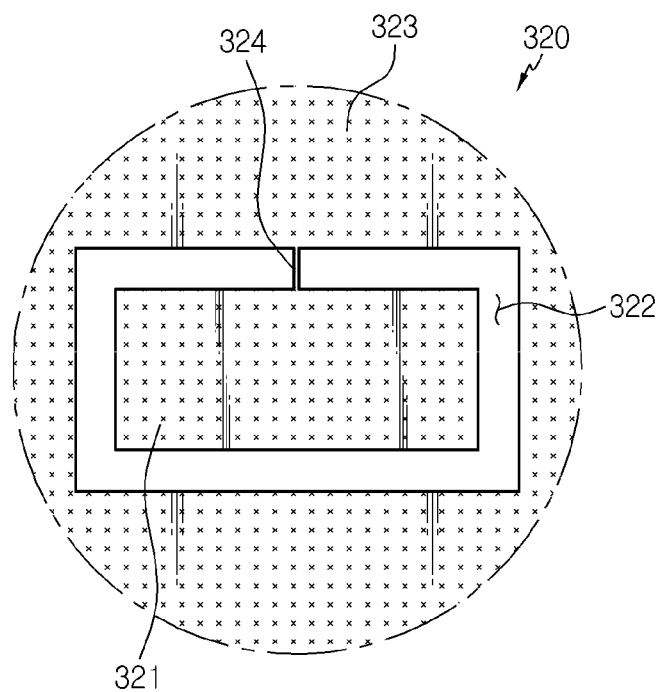
FIG. 8 is a partial enlarged view showing a conductive plate, employed at a cylindrical secondary battery module according to the second embodiment of the present disclosure.

FIG. 8 is a partial enlarged view showing a conductive plate 320, employed at a cylindrical secondary battery module according to the second embodiment of the present disclosure.

Hereinafter, the operations and effects of the cylindrical secondary battery module according to the second embodiment of the present disclosure will be described with reference to FIG. 8. However, the same feature as described in relation to the cylindrical secondary battery module 10 according to the first embodiment of the present disclosure will not be described in detail again.

The second embodiment of the present disclosure is different from the first embodiment in the point that the welding portion 321 of the conductive plate 320 is not divided.

Referring to FIG. 8, unlike the first embodiment, the cut portion 328 is not formed at the welding portion 321, and one welding portion 321 is formed inside the hole 322. In the second embodiment, the welding portion 321 may be electrically connected to the cylindrical secondary battery module 10 by various types of welding, such as laser welding, rather than resistance welding. However, the welding of the second embodiment is not limited to laser welding and may employ various types of welding known in in the art.

Meanwhile, a secondary battery pack (not shown) according to an embodiment of the present disclosure, may include one or more cylindrical secondary battery modules 10 according to an embodiment of the present disclosure as described above. Also, in addition to the cylindrical secondary battery modules 10, the secondary battery pack (not shown) may further includes a case for accommodating the secondary battery modules, and various devices for controlling charge and discharge of the secondary battery modules, such as a BMS, a current sensor, and the like.

Meanwhile, a vehicle (not shown) according to an embodiment of the present disclosure may include the cylindrical secondary battery module 10 or the secondary battery pack (not shown) described above, and the secondary battery pack (not shown) may include the secondary battery module 10. In addition, the secondary battery module 10 according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a cylindrical secondary battery module and is particularly applicable to an industry related to a secondary battery.

What is claimed is:
1. A secondary battery module, comprising:
a plurality of cylindrical secondary battery cells respectively having a battery case in which an electrode assembly and an electrolyte are accommodated;
a cell frame at which the plurality of cylindrical secondary battery cells is disposed; and
a bus bar electrically connected to the plurality of cylindrical secondary battery cells and having a fusing portion,
wherein the bus bar has a plurality of layers made of different materials from each other,
wherein the plurality of layers of the bus bar include:
at least one synthetic resin film having a hollow formed therein; and
a conductive plate protected by the at least one synthetic resin film,
wherein the bus bar has a plate shape to cover at least one of an upper portion and a lower portion of the plurality of cylindrical secondary battery cells, and the fusing portion is formed at the bus bar in a number corresponding to the number of the plurality of cylindrical secondary battery cells,
wherein the conductive plate includes:
a welding portion provided to be coupled to one cylindrical secondary battery cell among the plurality of cylindrical secondary battery cells by welding;
a hole formed along a periphery of the welding portion;
a large-area plate portion spaced apart from the welding portion by the hole to be distinguished from the welding portion; and
the fusing portion formed to connect the welding portion and the large-area plate portion so as to be cut off when an overcurrent flows at the conductive plate, and
wherein the hole, the large-area plate portion, the fusing portion and a peripheral portion of the welding portion are covered by the at least one synthetic resin film, while only an interior portion of the welding portion is exposed to the outside through the hollow,
wherein the hole, the large-area plate portion, the fusing portion, and the welding portion are all coplanar,
wherein the welding portion has a width along a first direction and a length along a second direction, the width being less than the length,
wherein the fusing portion is parallel to the first direction and perpendicular to the second direction, wherein the welding portion is divided into a first resistance welding portion and a second resistance welding portion by a cut portion formed at the center of the welding portion, wherein the cut portion has a length parallel to the fusing portion, and is aligned with the fusing portion along the first direction, and wherein the cut portion is enclosed by the first resistance welding portion and the second resistance welding portion of the welding portion, and not connected to the hole.

2. The secondary battery module according to claim 1, wherein the bus bar is configured so that two synthetic resin films are coupled to an upper surface and a lower surface of the conductive plate, respectively.

3. The secondary battery nodule according to claim 1, wherein two synthetic resin films are respectively coupled to an upper side and a lower side of the conductive plate to surround the conductive plate.

4. The secondary battery module according to claim 1, wherein a width of the fusing portion is smaller than a width of the hole.

5. A secondary battery pack, comprising a secondary battery module defined in claim 1.

6. A vehicle, comprising a secondary battery module defined in claim 1.

7. A secondary battery module, comprising:
a plurality of cylindrical secondary battery cells respectively having a battery case in which an electrode assembly and an electrolyte are accommodated;
a cell frame at which the plurality of cylindrical secondary battery cells is disposed; and
a bus bar electrically connected to the plurality of cylindrical secondary battery cells and having a fusing portion and a hole,
wherein the bus bar has at least one synthetic resin film having a hollow formed therein, and a conductive plate protected by the at least one synthetic resin film and having a welding portion,
wherein the fusing portion is entirely coplanar with the conductive plate, and the fusing portion, the hole and a peripheral portion of the welding portion are covered by the at least one synthetic resin film, and
wherein the welding portion has a width along a first direction and a length along a second direction, the width being less than the length,
wherein the fusing portion is parallel to the first direction and perpendicular to the second direction,
wherein the welding portion is divided into a first resistance welding portion and a second resistance welding portion by a cut portion formed at the center of the welding portion,
wherein the cut portion has a length parallel to the fusing portion, and is aligned with the fusing portion along the first direction, and
wherein the cut portion is enclosed by the first resistance welding portion and the second resistance welding portion of the welding portion, and not connected to the hole.

8. The secondary battery module according to claim 7, wherein the conductive plate includes:
the welding portion provided to be coupled to one cylindrical secondary battery cell among the plurality of cylindrical secondary battery cells by welding;
the hole formed along a periphery of the welding portion;
a large-area plate portion spaced apart from the welding portion by the hole to be distinguished from the welding portion; and
the fusing portion formed to connect the welding portion and the large-area plate portion so as to be cut off when an overcurrent flows at the conductive plate, and
wherein the large-area plate portion is further covered by the at least one synthetic resin film, while only an interior portion of the welding portion is exposed to the outside.

* * * * *